Feb. 16, 1960

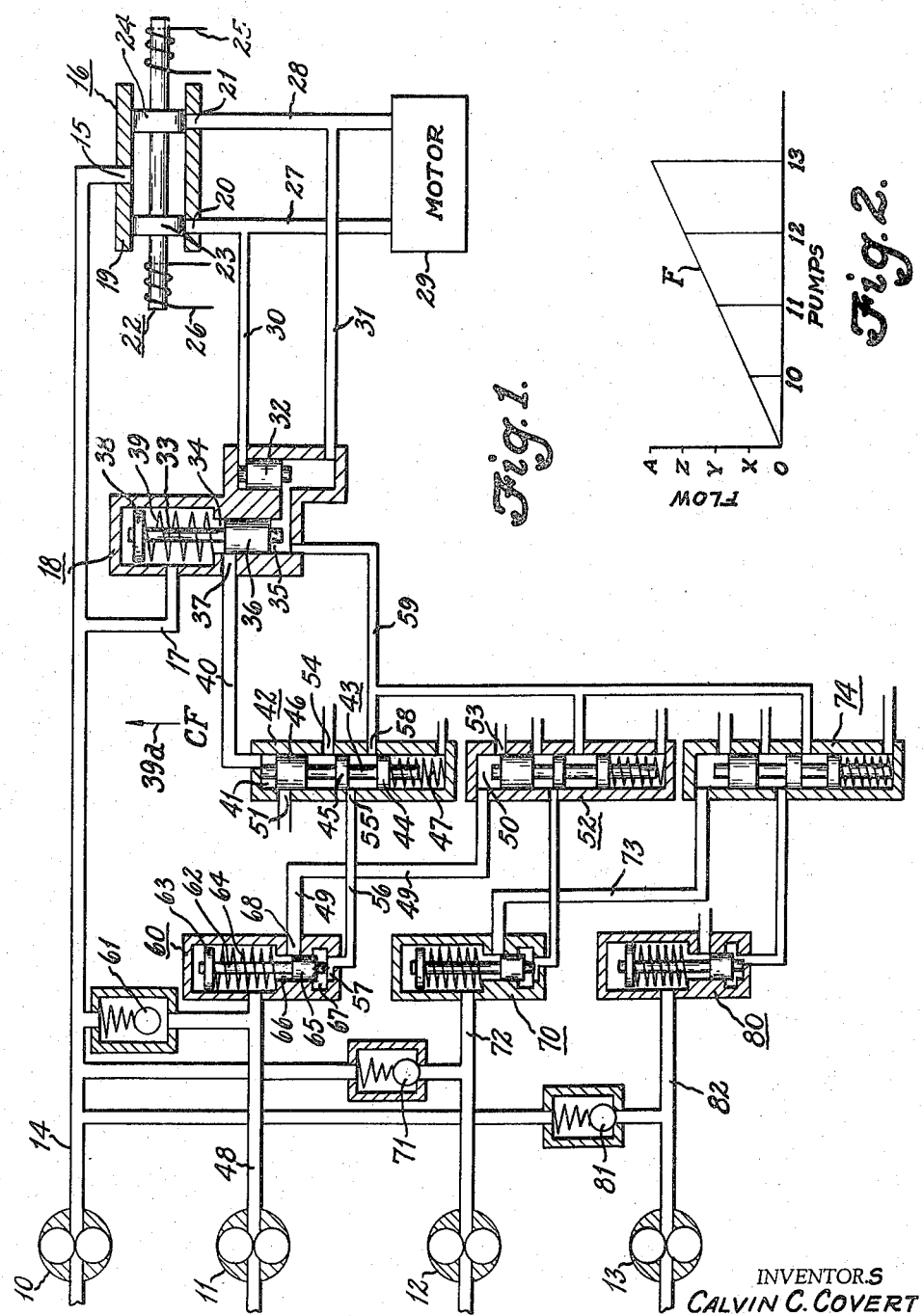

C. C. COVERT ET AL 2,924,940

PUMP CONTROL SYSTEM

Filed Nov. 19, 1956

INVENTORS
CALVIN C. COVERT
BY DALE W. MILLER

D. C. Staley
ATTORNEY

United States Patent Office 2,924,940
Patented Feb. 16, 1960

2,924,940

PUMP CONTROL SYSTEM

Calvin C. Covert, Dayton, and Dale W. Miller, Brookville, Ohio, assignors to General Motors Corporation, Detroit, Mich., a corporation of Delaware Application November 19, 1956, Serial No. 623,161

11 Claims. (Cl. 60—52)

The present invention pertains to fluid pressure systems, and more particularly to a pump control system for a plurality of constant displacement pumps including means for obtaining an infinitely variable flow rate.

Heretofore, it has been proposed to control a plurality of constant displacement pumps by means of a flow regulator, or pump control valve, which responds to the requirements of the fluid pressure system for connecting the output of additional pumps in parallel with a continuously operated pump. An illustration of a system of this type is disclosed in the Moore et al. Patent No. 2,626,669. In addition, it has been suggested to employ a fluid pressure actuated clutch for activating or deactivating auxiliary pumps, such a system being disclosed in copending application, S.N. 320,797, Berninger et al., filed November 15, 1952, now Patent #2,773,452. The present invention is directed to an improved pump control system of the general type shown in the aforementioned Moore et al. patent, and specifically is directed to a system for connecting an additional constant displacement pump through valve means which are capable of producing an infinitely variable flow rate. Accordingly, among our objects are the provision of a pumping system including a plurality of constant displacement pumps together with means for successively activating or deactivating additional pumps in accordance with the demand for flow; the further provision of a multiple pump system including means for obtaining only the desired flow from the additional pumps as they are connected in the system; and the still further provision of a unique pump control valve assembly arranged to give a continuously variable flow rate in a multiple pump system.

The aforementioned and other objects are accomplished in the present invention by continuously driving a plurality of constant displacement pumps, and by controlling the by-passing of fluid pumped by one or more of the pumps through a unique flow and pressure control arrangement so as to obtain the desired flow rate in the system. Specifically, the fluid pressure system includes four continuously operated constant displacement pumps. The output of one pump is connected through a pressure control valve including an equal area element and a shuttle valve, to a high pressure trunk line. The high pressure trunk line connects with the supply port of a control valve, the outlet ports of which are connected to opposite sides of a reversible fluid motor. The equal area valve includes a plunger having opposed surfaces of equal area exposed respectively, to the higher of the pressures existent in the fluid motor, and to the pressure output of one of the pumps. The equal area element is spring biased and is also subject to the thrust of centrifugal force which acts in opposition to the pump supply pressure and aids the higher the pressures in the fluid motor. Thus, the pressure control valve, which controls a throttling port, maintains a predetermined pressure differential between the high pressure trunk line and the higher of the pressures in the motor. For instance this pressure differential may be on the order of 450 p.s.i. The second continuously operated pump has a branch connection, one branch connecting with the high pressure trunk line through a one-way check valve. The other branch connects with a second pressure control valve of an equal area type. In other words, the second pressure control valve includes a plunger which is spring biased in one direction, subject to centrifugal force in the same direction and includes a face area subjected to the higher of the pressure potentials in the fluid motor, and an opposed equal face area subject to the pressure output of the second pump. Similarly, a third and fourth pump are connected in parallel paths with the second pump and the high pressure trunk line and include their own pressure control valves.

The equal area type pressure control valve connected with the first pump controls a flow control valve which is spring actuated in one direction and servo actuated in the opposite direction. The first flow control valve is servo actuated from the throttling port of the equal area type pressure control valve. The system also includes two other flow control valves of identical design, the second flow control valve being controlled by the throttle port of the equal area pressure control valve of the second pump, and the third flow control valve being actuated by the equal area pressure control valve of the third pump. The unique multiple pump system of the present invention operates to give a continuously variable flow rate dependent upon the requirements, or demands, of the fluid motor associated with the fluid pressure system.

Structurally, the improved multiple pump system is designed for use in a variable pitch propeller of the general type disclosed in the aforementioned Patent #2,773,452. Thus, the pumps are disposed in a rotatable regulator assembly attached to a propeller hub, the regulator assembly including a stationary power gear about which the pump power gears rotate so that upon rotation of the propeller the pumps will be driven continuously. Moreover, the valve components which are subjected to centrifugal force, are mounted radially in the regulator so as to be actuated by centrifugal force.

Further objects and advantages of the present invention will be apparent from the following description, reference being had to the accompanying drawings wherein a preferred embodiment of the present invention is clearly shown.

In the drawings:

Figure 1 is a schematic diagram of the multiple pump fluid supply system.

Figure 2 is a graph depicting the variable flow rate characteristics of the system shown in Figure 1.

Figure 4:
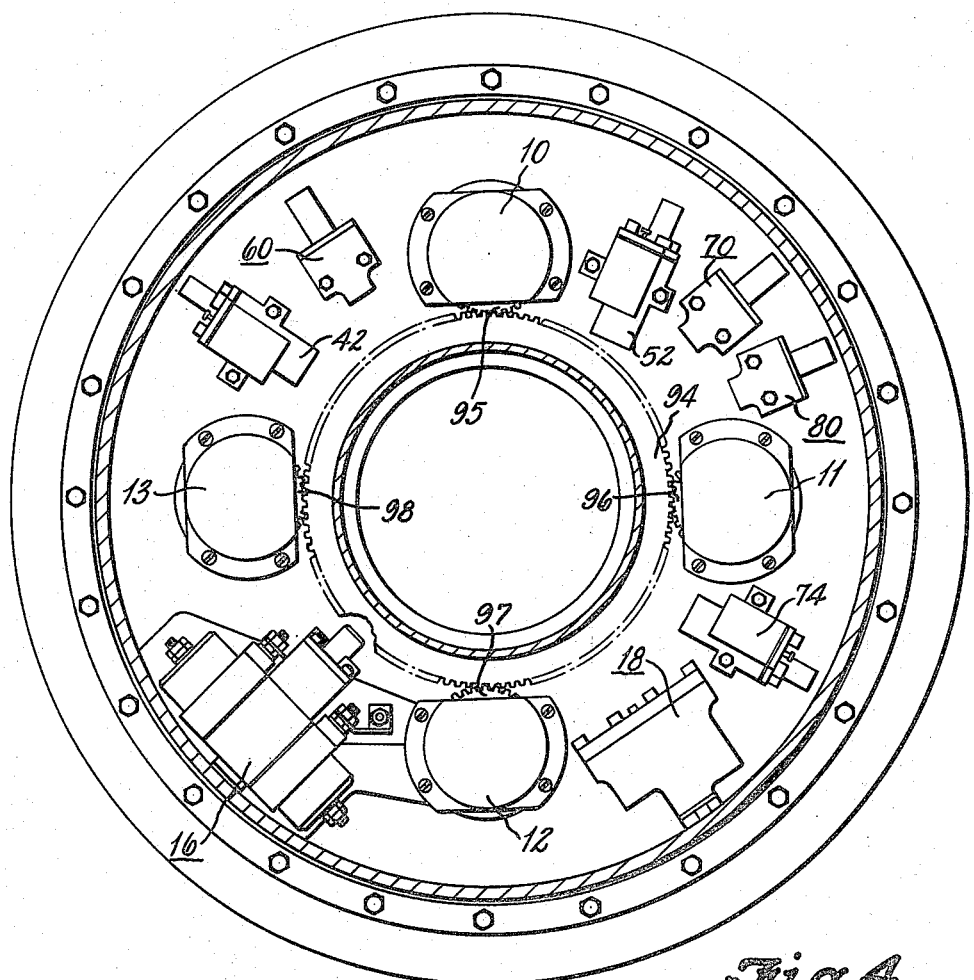
Figure 4 is an enlarged sectional view taken along line 4—4 of Figure 3.

With particular reference to Figure 1, the novel pump control system of this invention includes four continuously driven, constant displacement pumps indicated by numerals 10, 11, 12 and 13. The pumps may be of the gear type, and the inlets thereof are connected to a reservoir, not shown in Figure 1. The outlet of pump 10 is connected to a high pressure supply or trunk line 14. The other end of the high pressure trunk line 14 connects with a supply port 15 of a control valve assembly 16. In addition, the high pressure trunk line 14 has a branch conduit 17 which connects with an equal area type pressure control valve 18.

The control valve 16, as indicated, is of the solenoid operated type, and includes a valve guide 19 having in addition to the supply port 15, a pair of spaced control ports 20 and 21. A reciprocable spool valve 22 is disposed within the valve guide 19, the spool valve 22 having spaced lands 23 and 24. In accordance with the conventional practice, the spool valve 22 is normally centered so that lands 23 and 24 close ports 20 and 21, as shown, by a pair of opposed centering springs, not shown. The end portions of the spool valve 22 constitute armatures which are encircled by solenoid windings 25 and 26 respectively. The solenoid windings 25 and 26 can be energized from any suitable electrical control system as is well known in the art, and constitutes no part of this invention.

The control ports 20 and 21 are connected to control conduits 27 and 28 respectively, which connect with opposite ends of a double acting fluid motor generally indicated by the numeral 29. Conduits 27 and 28 connect with branch conduits 30 and 31, respectively, which communicate with opposite ends of a shuttle valve 32 constituting a component of the equal area pressure control valve 18.

The equal area pressure control valve 18 is so named because it includes a plunger 33 having opposed equal effective areas 34 and 35. The area 34 and the area of the end of the rod are exposed to the pressure in trunk line 14 as communicated thereto through branch conduit 17. The area 35 is exposed to the higher of the pressures existent in opposite sides of the motor 29 as evidenced in either conduits 30 or 31 which is applied to the area 35 by the shuttle valve 32. The land 36 of the plunger controls a throttling port 37. The plunger 33 includes a damping head 38 which is disposed within a body chamber, the damping head being engaged by a compression spring 39, the opposite end of which bears against the valve housing. Spring 39 biases the plunger 33 upwardly as viewed in Figure 1. In addition, as will be pointed out more particularly hereinafter, the valve element 33 is subjected to centrifugal force in the direction of arrow 39a which assists the spring 39 in urging the valve plunger 33 upwardly. In addition the higher of the two pressures communicated to act on surface 35 also urges the valve element 33 upwardly, while the pressure through line 17 acts on the surface 34 to oppose upward movement of the valve element 33. The net result of these opposing forces is that the pressure maintained in trunk line 14 is a predetermined amount greater than the pressure in the motor 29. More particularly, the valve unit can be arranged so that the pressure in line 14 is approximately 450 p.s.i. above the greater of the pressures in the motor 29. The equal area pressure control valve 18 operates on the demand principle, that is when the demand for flow and pressure increases by the motor 29, the valve element 33 will variably control the throttle port 37 so as to meet the flow and pressure requirements of the system.

When the flow requirements of the system cannot be supplied by one pump 10, the land 36 on the equal area valve element 33 will completely close throttle port 37. Throttle port 37 is connected by conduit 40 to a servo chamber 41 of a flow control valve 42. The flow control valve 42 has disposed therein a plunger 43 having axially spaced lands 44, 45 and 46. The plunger 43 is subjected to the thrust of centrifugal force in the direction of arrow 39a which biases upwardly. In addition, the plunger 43 is engaged by a spring 47 which also urges it upwardly to the position shown in Figure 1. However, when throttle port 37 is open, the excess flow produced by pump 10 will be diverted to the servo chamber 41 so as to move the plunger 43 downwardly. When plunger 43 is moved downwardly, the output of pump 11 from conduit 48 passes into conduit 49 and through servo chamber 50 of a second flow control valve 52 from which it flows to drain through port 53. The excess flow from conduit 40 which flows to servo chamber 41 can flow to drain through port 51.

When the flow requirements of the system cannot be met by the pump 10, the throttling port 37 will be closed by the land 36, at which time the spring 47 aided by centrifugal force will move the plunger 43 to the position shown in Figure 1 at which time the output of pump 11 will be connected to the trunk line 14 as controlled by an equal area pressure control valve 60 through the one-way, spring biased check valve 61.

The flow control valve 42 also includes a drain port 54 and a port 55 which is connected by conduit 56 to a chamber 57 of the equal area pressure control valve 60. The land 46 on the plunger 43 controls the port 51, the land 45 controls the connection of ports 54 and 55, and the land 44 controls the connection of ports 55 and 58. The port 58 is connected to a conduit 59 which communicates with the underside of the valve element 33 of the equal area pressure control valve 18.

When the valve element 43 is in the position shown in Figure 1, the higher of the pressure potentials existent in either conduits 27 and 28 is communicated through either conduit 30 or 31, and the shuttle valve 32 to the conduit 59. Pressure in conduit 59 is connected with conduit 56 through ports 55 and 58, the conduit 56 communicating with the chamber 57. The equal area pressure control valve 60 includes a casing within which a plunger 62 is disposed. The plunger 62 includes a damping head 63 which is engaged by a spring 64, the opposite end of which engages the valve housing. The spring 64 urges the plunger 62 upwardly, the plunger 62 also being urged upwardly by centrifugal force. Plunger 62 includes a land 65 having face area 66 and an equal face area 67 opposed to the face area 66. The area 67 is exposed to the chamber 57 which communicates with the higher of the pressures existent in the fluid motor 29. The area 66 and the area of the upper end of the rod are exposed to the output of pump 11, and the land 65 controls a throttle port 68 which connects with conduit 49. The equal area pressure control valve 60 is likewise of the flow and pressure demand type, and operates to throttle, or by-pass, the output of pump 11 to meet the requirements of the system. When the requirements of the system cannot be met by the combined flow of pumps 10 and 11, the pump 12 will be connected in the system through a similar type equal area pressure control valve 70. Since equal area pressure control valves 60, 70 and 80 are of identical construction, the valves 70 and 80 will not be described in detail. Suffice it to say that each of the valves includes an inlet conduit 72 and 82, respectively, which is connected to the outlet of pumps 12 and 13, respectively. In addition, the conduits 72 and 82 communicate with check valves 71 and 81, respectively. The throttling port of the pressure control valve 70 is connected by conduit 73 to the flow control valve 74, the flow control valves 52 and 74 being of identical construction with the flow control valve 42. Thus, the flow control valves 52 and 74 will not be described in detail. In this connection, it is to be understood that the flow control system of this invention results in a continuously variable flow rate dependent upon the demand requirements of the motor 29.

With particular reference to Figure 2, the graph depicts the output flow of the multiple pump system. The abscissa indicates the output flows of pump 10, 11, 12 and 13 as they are added in the high pressure trunk line 14. The ordinate of the graph indicates flow in cubic inches per minute. Thus, when pump number 10 is operating the flow can be varied from zero cubic inches per minute to X cubic inches per minute. When pump numbers 10 and 11 are connected in the flow can be varied from X to Y cubic inches per minute; with pumps 10, 11 and 12 from Y to Z cubic inches per minute; and when pumps 10, 11, 12 and 13 are connected from Z to A cubic inches per minute. It should be noted that the slope of the curve F as shown in Figure 1, which is the net flow from the pumps which are operating, is a straight line indicating that any desired flow rate can be obtained up to the maximum A.

Figure 3:
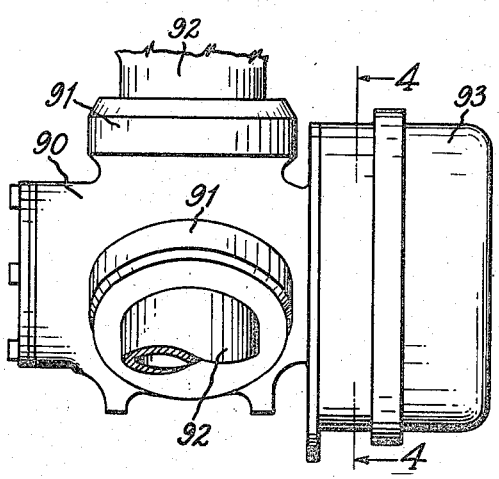
Figure 3 is a fragmentary view, partly in section and partly in elevation, of a variable pitch propeller unit including the pump control system of this invention.

With particular reference to Figures 3 and 4, a structural embodiment of the pump system as disposed in a variable pitch propeller will be described. As shown in Figure 3, the propeller includes a hub 90 having a plurality of radially extending sockets 91 within which propeller blades 92 are journalled for rotation about their longitudinal axes to different pitch positions. The propeller arrangement may be of the type generally shown in the Blanchard et al. Patents Nos. 2,307,101 and 2,307,102, and thus each propeller blade 92 includes an independent servo motor, or torque unit, for rotating the blade about its longitudinal axis. Movement of the several propeller blades 92 is coordinated by a master gear, not shown, supported for rotation about the horizontal propeller axis. Propeller hub 90 has attached thereto and rotatable therewith a regulator assembly 93. The regulator assembly constitutes a reservoir for hydraulic fluid employed to actuate the pitch adjusting torque units. The flow of hydraulic fluid under pressure is controlled by a suitable control valve as is well known in the art.

With particular reference to Figure 4, the regulator 93 constitutes a toroid, and the regulator assembly includes a stationary pump power gear 94 about which the remaining pump regulator components rotate. The stationary pump power gear is engaged by pump driving gears 95, 96, 97 and 98 which are drivingly connected respectively, to pumps 10, 11, 12 and 13. During rotation of the propeller and the regulator, the hydraulic fluid forms a toroid adjacent the outer periphery of the regulator assembly from which the pumps 10, 11, 12 and 13 can draw fluid and discharge same under pressure. The pressure control valve 18 is shown along a radial line so that the elements thereof can respond to centrifugal force. The solenoid valve 16 is shown located at right angles to a radial line so that centrifugal force will not affect the position of the spool valve. The three flow control valves are also indicated along the radial lines, namely valves 42, 52 and 74, and in addition the equal area pressure control valves 60, 70 and 80 are located along radial lines so as to respond to centrifugal force. The check valves 61, 71 and 81 are incorporated within the pumps and thus, do not appear structurally in Figure 4. When the fluid pressure system of this invention is utilized in a variable pitch propeller, it will be appreciated that energization of the pumps 10, 11, 12 and 13 is dependent upon propeller rotation. In other words, the pumps 10, 11, 12 and 13 are energized automatically incident to propeller rotation so as to draw fluid from the reservoir and deliver the fluid under pressure to their respective discharge conduits.

From the foregoing it is manifest that the present invention provides a unique multiple pump system wherein the output flow rate can be varied continuously from zero to the maximum output of a multiple pump system. Moreover, this unique result is achieved by incorporating novel flow and pressure control demand valves in the arrangement hereinbefore described.

While the embodiment of the present invention as herein disclosed constitutes a preferred form, it is apparent that other forms might be adopted.

What is claimed is as follows:

1. In a fluid pressure system, the combination including, a servo motor connected in said system and subject to variable loads, a plurality of continuously operable pressure developing pumps, one of said pumps always being connected into said system, a pressure control valve connected with the output of said one pump and with said servo motor for maintaining a predetermined pressure differential between the output of said one pump and the pressure requirements of the servo motor to supply flow in accordance with demand, said pressure control valve diverting excess flow from said one pump to a servo actuated flow control valve for one of said remaining pumps, a pressure control valve connected with the output of said one of said remaining pumps and with the servo motor for controlling the connection of said one of said remaining pumps with the servo motor, and additional pressure control and flow valves for the other remaining pumps for progressively connecting these pumps so as to maintain a flow in accordance with demand.

2. A fluid pressure system, including in combination, a servo motor subject to variable loads, continuously operable primary and secondary pressure developing means, said primary pressure developing means having its output connectable with said servo motor at all times, first pressure control means connected with said primary pressure developing means and said servo motor for controlling the output of said primary pressure developing means in accordance with the demand of said servo motor to meet the flow requirements of said servo motor and diverting excess flow from said primary pressure developing means, second pressure control means connected with the secondary pressure developing means, flow responsive means connected with said first pressure control means and said second pressure control means and responsive to the absence of excess flow from said first pressure developing means for connecting the second pressure control means with said servo motor whereby the output of the secondary pressure developing means will be controlled in accordance with the demand of said servo motor, and a check valved conduit connecting said secondary pressure developing means with the output of said primary pressure developing means when the primary pressure developing means cannot meet the flow requirements of said servo motor.

3. A fluid pressure system, including in combination, a servo motor subject to variable loads, continuously operable primary and secondary pressure developing means, said primary pressure developing means having its output connectable with said servo motor at all times, first pressure control means connected with said primary pressure developing means and said servo motor for controlling the output of said primary pressure developing means in accordance with the demand of said servo motor to meet the flow requirements of said servo motor, an excess flow conduit connected to said first pressure control means, said first pressure control means being operable to divert excess flow from said first pressure developing means to said conduit, second pressure control means connected with said secondary pressure developing means, a flow responsive valve connected to said excess flow conduit and said second pressure control means and responsive to the absence of flow in said conduit for connecting the said second pressure control means with said servo motor so as to control the output of said secondary pressure developing means in accordance with the demand of said servo motor, and a check valved conduit connecting the secondary pressure developing means with the output of said primary pressure developing means when the primary pressure developing means cannot meet the flow requirements of said servo motor.

4. A fluid pressure system, including in combination, a servo motor subject to variable loads, a pair of continuously operable pressure developing pumps, one of said pumps having its output connectable with said servo motor at all times, a first pressure control valve connected with said first pump and said servo motor for controlling the output of said first pump in accordance with the demand of said servo motor to meet the flow requirements of said servo motor, an excess flow conduit connected to said first pressure control valve, said first pressure control valve being operable to divert any excess flow of said first pump to said conduit, a second pressure control valve connected with said second pump, a flow responsive valve connected to said excess flow conduit and said second pump and responsive to the absence of flow in said conduit for connecting the second pressure control valve with said servo motor so as to control the output of the second pump in accordance with the demand of said servo motor, and a check valved conduit connecting the second pump with the output of the first pump when the first pump cannot meet the flow requirements of said servo motor.

5. The fluid pressure system set forth in claim 4 wherein said flow responsive valve is normally spring biased to a position blocking the connection between said second pressure control valve and said servo motor.

6. The fluid pressure system set forth in claim 4 wherein said pressure control valves include plungers having opposed areas subject to the output pressure of their respective pumps and connectable with said servo motor, and wherein said plungers are spring biased in one direction so as to maintain a predetermined pressure differential between the pressure output of their respective pumps and the pressure existent in said servo motor.

7. A fluid pressure system, including in combination, a servo motor subject to variable loads, a plurality of continuously operable pressure developing pumps, one of said pumps being connectable with said servo motor at all times, a first pressure control valve connected with said first pump and said servo motor for controlling the output of the first pump in accordance with the demands of said servo motor to meet the flow requirements of the servo motor and divert any excess flow from said first pump, a pressure control valve for each of the remaining pumps, each pressure control valve being connected with its respective pump and capable of diverting any excess flow produced thereby, a flow responsive valve for each of the remaining pumps, each flow responsive valve being connected with the pressure control valve of its respective pump and responsive to the absence of excess flow from the next preceding pressure control valve for connecting its respective pressure control valve with said servo motor so that the output of its respective pump will be controlled in accordance with the demand of said servo motor and a check valved conduit for each of said remaining pumps for connecting the output of said remaining pumps with the output of said first pump whereby said remaining pumps can have their outputs progressively connected with said servo motor in accordance with the flow requirements of said servo motor.

8. A fluid pressure system, including in combination, a servo motor subject to variable loads, a plurality of continuously operable pressure developing pumps, one of said pumps being connectable with said servo motor at all times, a first pressure control valve connected with said first pump and said servo motor for controlling the output of said first pump in accordance with the demand of said servo motor to meet the flow requirements of said servo motor, an excess flow conduit connected to said first pressure control valve, said first pressure control valve being operable to divert any excess flow produced by said first pump to said conduit, a pressure control valve for each of the remaining pumps, each pressure control valve being connected with its respective pump and an excess flow conduit, a flow responsive valve for each of the remaining pumps, each flow responsive valve being connected with the pressure control valve of its respective pump and the excess flow conduit of the next preceding pressure control valve, each flow responsive valve being responsive to the absence of the flow in its respective excess flow conduit for controlling the output of its respective pump and connecting its respective pressure control valve with said servo motor to control the output of its respective pump in accordance with the demand of said servo motor, and a plurality of check valved conduits connecting said remaining pumps with the output of said first pump whereby the remaining pumps can have their outputs progressively connected with the output of said first pump in accordance with the flow requirements of said servo motor.

9. The fluid pressure system set forth in claim 8 including, a control valve connected between the output of said first pump and said servo motor for controlling the application of fluid under pressure to said servo motor.

10. The fluid pressure system set forth in claim 8 wherein each flow responsive valve comprises a housing having a reciprocable plunger therein having a plurality of axially spaced lands thereon and resilient means normally biasing said plunger to a position wherein the connection with its respective pressure control valve and the servo motor is blocked.

11. The fluid pressure system set forth in claim 8 wherein each pressure control valve includes a housing having a reciprocable plunger therein having opposed areas, one of which is connectable with the output of its respective pump and the other of which is connectible to the servo motor, and resilient means normally biasing said plunger so as to maintain a predetermined pressure differential between the output of its respective pump and the pressure potential existent in said servo motor.

References Cited in the file of this patent

UNITED STATES PATENTS

| | | |
|---|---|---|
| 2,420,052 | Muir | May 6, 1947 |
| 2,507,671 | May | May 16, 1950 |
| 2,536,486 | Berry | Jan. 2, 1951 |
| 2,545,684 | Carson et al. | Mar. 20, 1951 |
| 2,545,856 | Orr | Mar. 20, 1951 |
| 2,568,356 | Moulden | Sept. 18, 1951 |
| 2,611,319 | Strehlow et al. | Sept. 23, 1952 |
| 2,617,361 | Neal | Nov. 11, 1952 |
| 2,665,637 | Lauck | Jan. 12, 1954 |
| 2,762,305 | Huber et al. | Sept. 11, 1956 |